United States Patent [19]

Ahlrich

[11] 4,231,769
[45] Nov. 4, 1980

[54] FILTERED VENTILATING SYSTEM

[76] Inventor: Willard K. Ahlrich, 2227 Pine Lake Dr. N.W., Stuart, Fla. 33494

[21] Appl. No.: 879,066

[22] Filed: Feb. 21, 1978

[51] Int. Cl.² .......................................... B01D 45/18
[52] U.S. Cl. .................................. 55/242; 55/328;
55/493; 55/444; 55/DIG. 36; 126/299 E
[58] Field of Search ................. 55/DIG. 36, 242, 230, 55/328, 444, 493; 126/299 D, 299 E, 299 F

[56] References Cited

U.S. PATENT DOCUMENTS

| | | | |
|---|---|---|---|
| 1,691,514 | 11/1928 | Dollinger | 55/242 |
| 2,901,226 | 8/1959 | Modine | 55/267 |
| 3,082,680 | 3/1963 | Nevin et al. | 55/DIG. 36 |
| 3,086,342 | 4/1963 | Goettl | 55/328 |
| 3,795,181 | 3/1974 | Lawson | 55/DIG. 36 |
| 3,839,848 | 10/1974 | Wood et al. | 55/97 |
| 3,910,782 | 10/1975 | Strable et al. | 55/DIG. 36 |
| 4,066,425 | 1/1978 | Nett | 55/DIG. 36 |
| 4,081,255 | 3/1978 | Evans | 55/242 |
| 4,085,735 | 4/1978 | Kaufman et al. | 55/DIG. 36 |
| 4,089,327 | 5/1978 | Welsh | 55/DIG. 36 |
| 4,099,938 | 7/1978 | Onnen | 55/242 |

Primary Examiner—Bernard Nozick
Attorney, Agent, or Firm—Blanchard, Flynn, Thiel, Boutell & Tanis

[57] ABSTRACT

A filtered ventilating system for a cooking unit incorporates a hood emplaceable above a cooking unit. An exhaust stack extends from the hood for removing cooking fumes captured by the hood. A barrier wall divides the interior of the hood into inlet and outlet zones open to the cooking unit and exhaust stack, respectively, and is provided with a fume opening to receive a filter for grease and the like. Wash down pipes respectively extend along the exhaust zone of the hood adjacent the filter and along an exhaust stack. A motor rotates the wash down pipes and a suitable supply provides wash liquid to the pipes, which are thus energizable to simultaneously rotate and spray the wash liquid onto adjacent hood, filter and exhaust stack surfaces for cleaning same. Pivot and latch apparatus supports the filter for reversal on the barrier wall, to permit both sides of the filter to be cleaned by liquid from the wash down pipes.

16 Claims, 13 Drawing Figures

U.S. Patent Nov. 4, 1980 Sheet 1 of 4 4,231,769
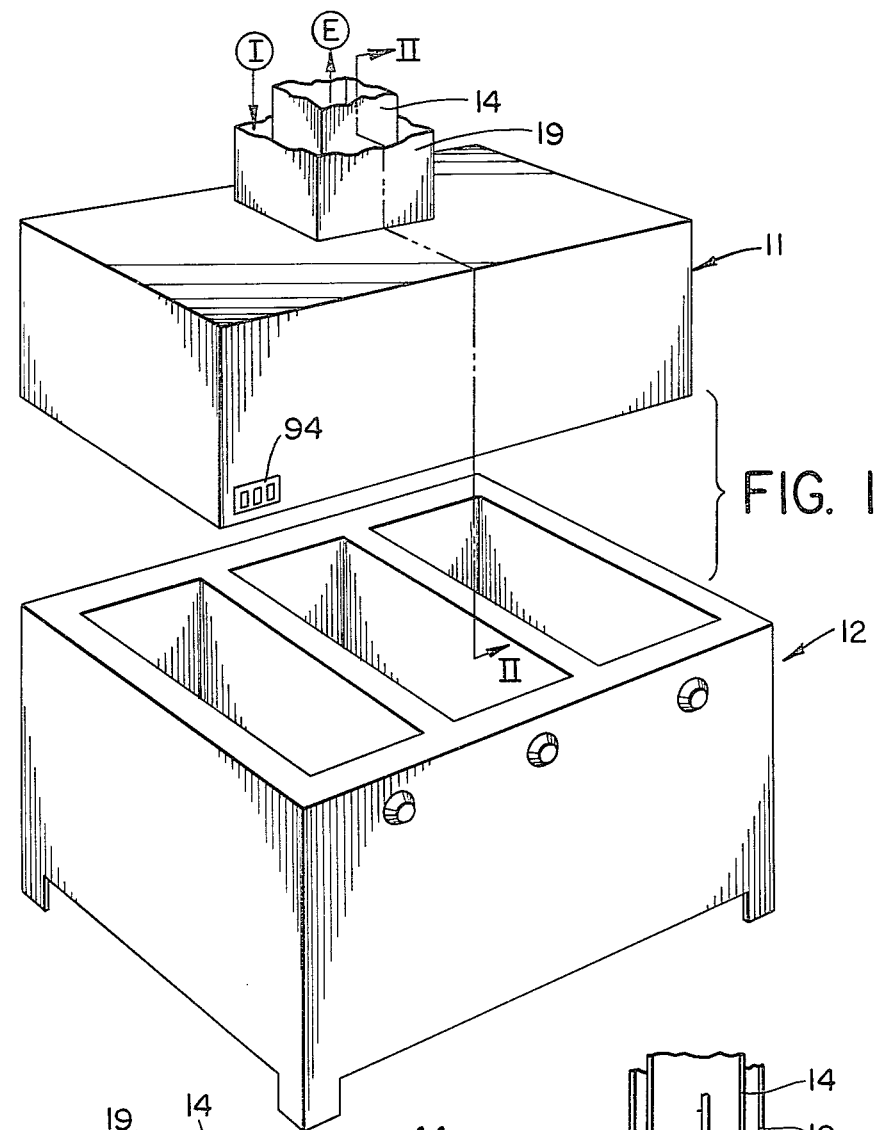
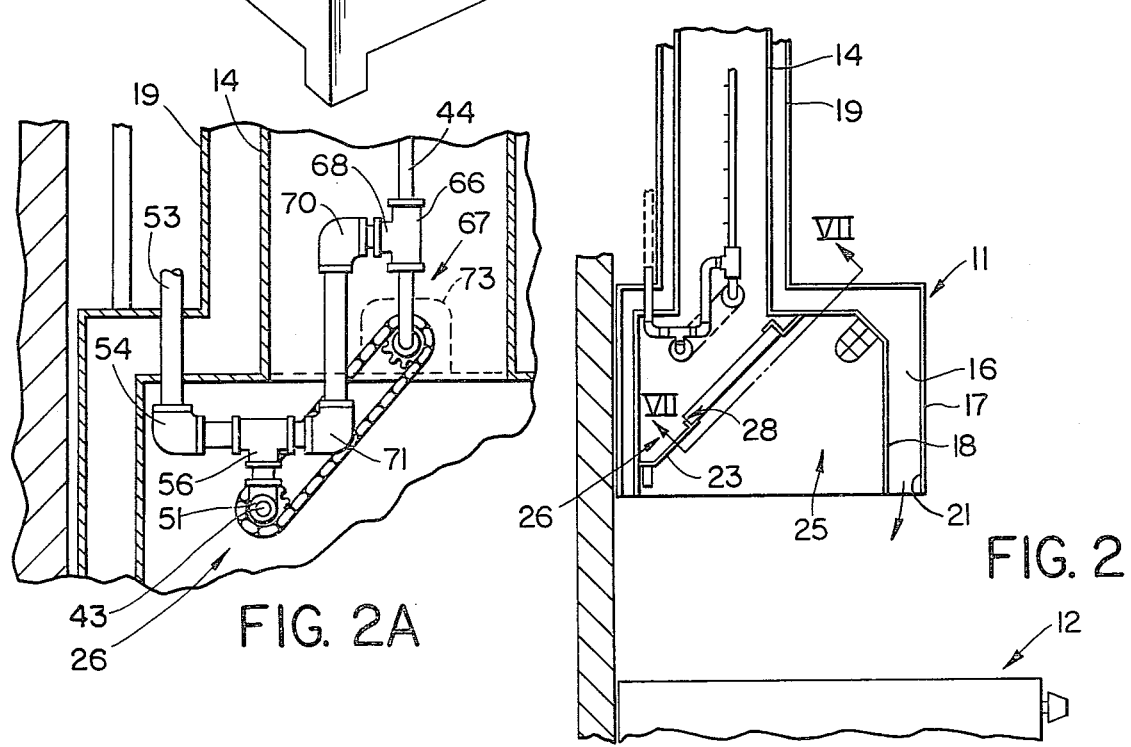
FIG. 1
FIG. 2
FIG. 2A

FILTERED VENTILATING SYSTEM

FIELD OF THE INVENTION

This invention relates to a filtered ventilating system for a cooking unit and more particularly to such a system providing for cleaning of ventilating system parts.

BACKGROUND OF THE INVENTION

It is conventional practice in restaurants, and the like to employ ventilating hoods above cook tops, deep fat fryers, and other cooking units and by use of fans to draw heated cooking vapors, often including volatilized grease, out of the cooking area through the hood and a communicating exhaust stack. In the absence of grease filters in the hood, a portion of the grease particles and the like entrained in the air captured by the hood pass through the exhaust stack to form undesirable environmental contamination. A remaining portion of the volatilized grease entrained in the airstream contacts and tends to condense on the cooler surfaces inside the hood and exhaust stack, eventually forming an inflammable material which, being close to the heat of the cooking unit, may create a potential fire hazard. To reduce the quantity of volatilized grease available passing to the outside atmosphere and condensing on the inner stack and hood surfaces, cooktop hoods are frequently provided with grease filters. Effective grease filters eliminate much of the environmental contamination and greatly slow grease buildup, by entrapment of substantial portions of the entrained volatilized greases and the like in the grease filter.

Condensed grease and the like will relatively quickly build up on the surfaces of the grease filter, and to a lesser extent may gradually build up on the interior surfaces of the hood and stack beyond the filter. If this buildup is allowed to continue, the filter will gradually clog and loose filtering efficiency and the grease buildup in stack and filter may eventually be a fire hazard. Unfortunately, it is messy and time consuming to attempt to clean the interoir surfaces of the hood and exhaust stack, where access thereto is obtainable, and for that matter even to clean the grease filter.

Prior attempts of which I am aware, to deal with this problem, have been fragmentary at best.

For example, U.S. Pat. No. 3,805,685 (Carnes) provides fixed wash liquid pipes within the hood, disposed on opposite sides of a filter shielded from the cooking unit by a series of intervening baffles, wherein nozzles on the fixed pipes spray a wash liquid onto opposite sides of the filter simultaneously for cleansing purposes. However, it is not permissible to use this approach where one side of the filter unit is directly (i.e. visibly) exposed to the cooking unit since wash liquid from the spray nozzles, or bouncing off the exposed side of the filter unit, would fall on and contaminate the exposed cooking surfaces of the cooking unit. Further, with such fixed spray nozzles, it is difficult to obtain uniform application of the washing liquid to the filter unit faces. Also in such prior apparatus, no provision is made for cleaning the interior surfaces of the hood and exhaust stack beyond the filter.

Accordingly, the objects of this invention include provision of:

(1) A filtered ventilating system for a cooking unit, providing for rotating application of wash liquid sprays to interior contaminant and grease collecting surfaces of the hood and exhaust stack, and simultaneously to the back (stack facing) surfaces of a filter unit supported by the hood.

(2) A system, as aforesaid capable of cleaning with such wash liquid, both the inlet and outlet sides of the filter unit despite mounting of the filter unit to expose one of its sides directly to the cooking area and despite absence of wash down pipe spray nozzles between the filter unit and cooking unit.

(3) A system, as aforesaid, in which the filter unit shields the cooking area from wash down spray liquid and which is particularly adapted to use filter units generally of labyrinth type, e.g. employing opposed troughlike baffles which impart a sinuous flow pattern to cooking fumes traveling therethrough.

(4) A system, as aforesaid, in which the filter unit is readily reversed, side-for-side, in the hood, while yet remaining connected positively to the hood for ease in controlling and supporting the filter units during such reversal.

(5) A system, as aforesaid, which permits rotative driving, from a common motor, of wash down pipes extending transverse to one another in said hood and exhaust stack as well as providing for independent supply of wash liquid thereto from a common wash liquid source.

Other objects and purposes of this invention will be apparent to persons acquainted with apparatus of this general type upon reading the following specification and inspecting the accompanying drawings.

SUMMARY OF THE INVENTION

The objects and purposes of the invention are met by providing a filtered ventilating system for a cooking unit incorporating a hood emplaceable above a cooking unit and an exhaust stack extending from the hood for removing cooking fumes captured by the hood. A barrier wall divides the interior of the hood into inlet and outlet zones open to the cooking unit and exhuast stack, respectively, and is provided with a fume opening normally covered by a filter for grease and the like. Wash down pipes respectively extend along the exhaust zone of the hood adjacent the filter and along an exhaust stack. A motor rotates the wash down pipes and a suitable supply provides wash liquid to the pipes, which are thus energizable to simultaneously rotate and spray the wash liquid onto adjacent hood, filter and exhaust stack surfaces for cleaning same. Pivot and latch apparatus supports the filter for reversal on the barrier wall, to permit both sides of the filter to be cleaned by liquid from the wash down pipes.

BRIEF DESCRIPTION OF THE DRAWINGS

FIG. 1 is a fragmentary pictorial view of a ventilating hood, embodying the invention, shown in a position of use with respect to a cooking unit.

FIG. 2 is a fragmentary central cross-sectional view substantially taken on the line II—II in FIG. 1.

FIG. 2A is an enlarged fragment of FIG. 2.

DETAILED DESCRIPTION

Figure 3:
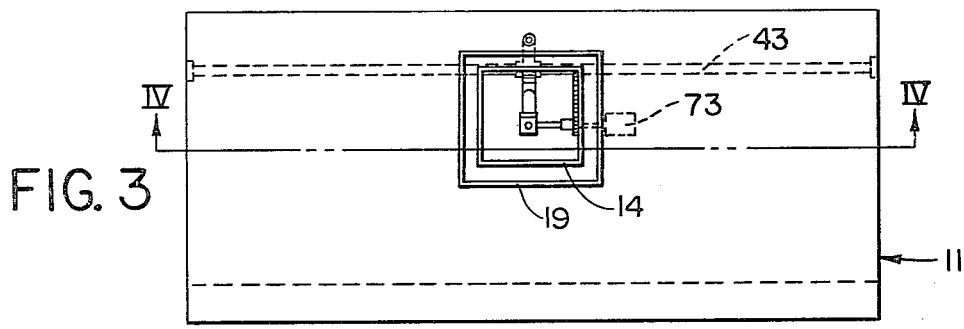
FIG. 3 is a top view of the ventilating hood of FIG. 1.

FIG. 1 discloses a typical operating environment for the apparatus of the present invention, in which a ventilating hood 11 is fixed with respect to and opens downward over a fume-producing device 12 such as a cooking unit or units, here exemplified by a three-bay deep fat fryer. Cooking fumes, particularly heated air laden with volatilized grease or the like (hereafter simply referred to grease laden air), rise from the upward facing surface of the cooking unit 12 and collect within the downward opening hood 11 to be drawn therefrom up a communicating exhaust stack 14 by conventional means such as an exhaust blower schematically indicated at E, conventionally, the exhaust blower vents the fumes outside the building containing the hood 11 and cooking unit 12. The hood 11 and exhaust stack 14 may be fixed with respect to the ceiling, wall, or floor of the building in any convenient manner. In the particular embodiment shown, the hood is double-walled to define an inlet air chamber 16 (FIG. 2) between inner and outer hood shells 17 and 18. The chamber 16 receives fresh air through an inlet air stack 19, surrounding and extending along the exhaust stack 14 preferably from outside the building, by a conventional inlet air mover schematically indicated at I, such as a conventional motor driven blower. A fresh air outlet 21 may be conventionally provided from the lower front edge of the inlet air chamber 16.

The hood 11 here shown has an interior defined by the top, front, rear and sidewalls of the inner shell 18 and which opens downward (as seen in FIG. 2) toward the cooking unit 12. The interior of the hood is divided by a barrier wall 23 (FIGS. 2 and 10) into an inlet zone 25 open toward the cooking unit 12, and an outlet zone 26 open toward the exhaust stack 14. The barrier wall 23 extends the full width of the hood interior and incorporates an opening 28, preferably extending over a large part of the height and width of such barrier wall, for communication from inlet zone 25 to the outlet zone 26. The barrier wall 23 is preferably sloped so as to face forward and downward toward the cooking unit 12 and such barrier wall extends from the back wall 31 to the top wall 32 of the inner shell, connecting with such top wall forward (to the right in FIG. 10) of the exhaust stack 14. In use, the opening 28 is normally occupied by a filter panel 35 which fully occupies the opening 28, such that air swept into the inlet zone 25 of the hood 11, from above the cooking unit, can proceed to the outlet zone 26 and exhaust stack 14 only by passing through the filter panel 35. The filter panel 35 is to remove at least most of the grease and other contaminants in the air received from the cooking unit, before such air passes through stack 14.

Turning now in more detail to the present invention, a wash down assembly 41 (FIGS. 2-6) includes an elongate hood wash down pipe 43 which effectively spans the width of the outlet chamber 26 of the hood. A stack wash down pipe 44 extends upward into the exhaust stack 14, preferably substantially along the central axis thereof and to a point near the top of such exhaust stack. Spray nozzles 46 distributed along the wash down pipes 43 and 44 face radially therefrom for spraying a suitable wash liquid onto the opposed surfaces of the hood inner shell, filter and exhaust stack.

In the preferred embodiment shown, the hood wash down pipe 43 is offset rearwardly (leftwardly in FIG. 2A) and downwardly from the stack wash down pipe 44 in exhaust stack 14, such that the pipe 43 is spaced behind and substantially centered on the filter opening 28 and a filter panel 35 located therein. When so placed, the pipe 43 lies at least near the geometric center of the triangular cross section hood outlet zone 26. The ends of pipe 43 are closed against leakage and supported for rotation by suitable bearings 47 and 48 (e.g. simple sleeve bearings or bushings) fixed on the end walls 49 (FIG. 4) of the hood 11. A conventional liquid supply swivel 51 (FIGS. 2A and 5 interposed intermediate the ends of the pipe 43 serves to supply wash liquid to the pipe 43 while assisting in supporting it for rotation. As a practical matter, it will be understood that the pipe is open within the swivel such that the swivel joins and supplies liquid to the two visible end segments of the pipe 43. The swivel 51 is formed as a tee which connects to a wash liquid supply pipe 53 (FIGS. 2A and 6) which extends into the outlet zone 26 within the hood 11 along any convenient path. In the embodiment shown, the supply pipe 53 enters the top of the hood behind the stacks 14 and 19 and communicates with the swivel 51 through an elbow 54 and tee 56 interconnected by suitable nipples.

The stack wash down pipe 44 is supported for rotation within the stack. Preferably, a rigid strap member 59 (FIGS. 4 and 6) extends across the exhaust stack 14 near the upper end thereof. The opposite ends of the strap member 59 are bent upward at 61 (FIG. 6) for securement to the sidewalls of the stack 14 as by screws or the like. The upper end of the stack pipe 44 is supported for rotation on the strap 59 in any convenient manner. In FIG. 5 for example, the upper end of pipe 44 is capped against leakage at 62, which cap 62 rides rotatably on a bushing 63 fixed to and extending through the strap 59. If desired, a collar 64 fixed to the pipe 44 beneath the strap 59 limits upward movement of the pipe.

Figure 5:
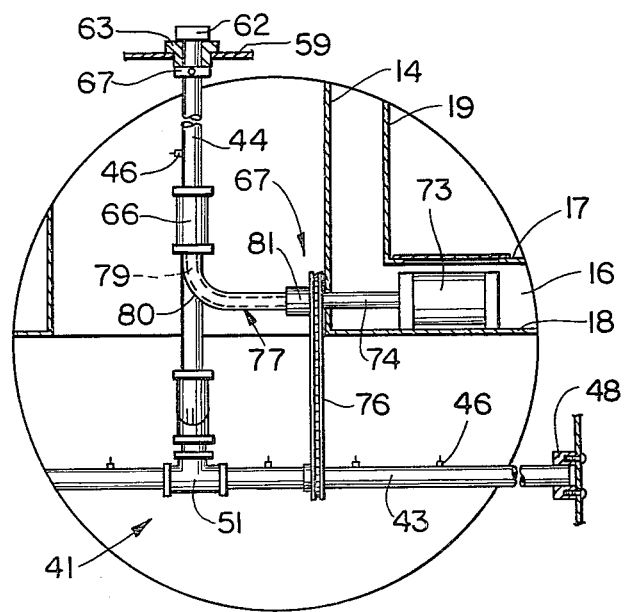
FIG. 5 is an enlarged fragment of FIG. 4.
Figure 6:
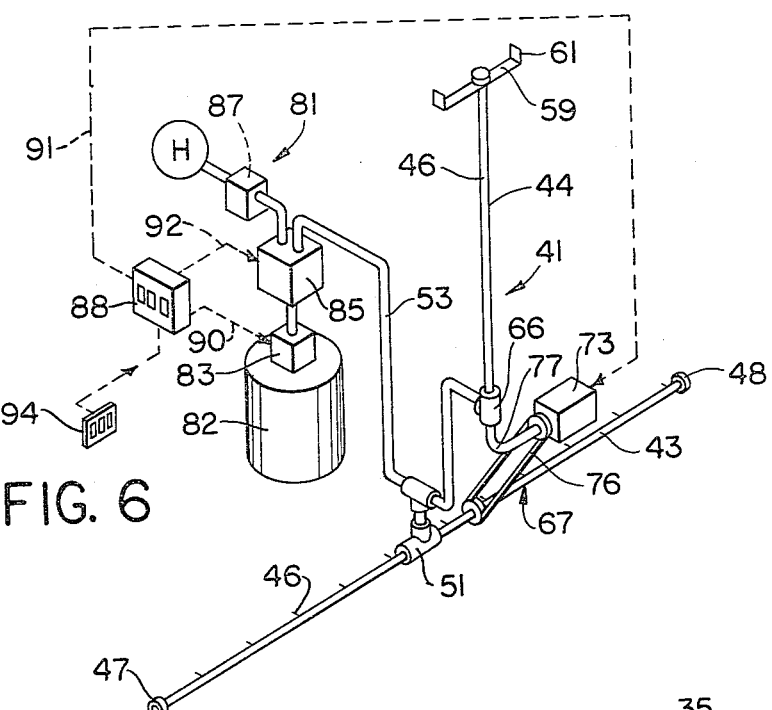
FIG. 6 is a diagrammatic pictorial view of the wash down assembly for the apparatus of FIGS. 1–5.

A swivel connector 66 (FIGS. 5 and 6) here serves to connect the lower end of stack pipe 44 not only with the liquid supply, but also with a rotary drive assembly generally indicated at 67 (FIGS. 2A, 5 and 6). The swivel connector 66, like swivel 51 above-mentioned, is of tee configuration, having a central liquid inlet leg 68 connected, here through elbows 70 and 71, to the wash liquid supply at elbow 56, through suitable interposed nipples or pipe lengths.

Figure 4:
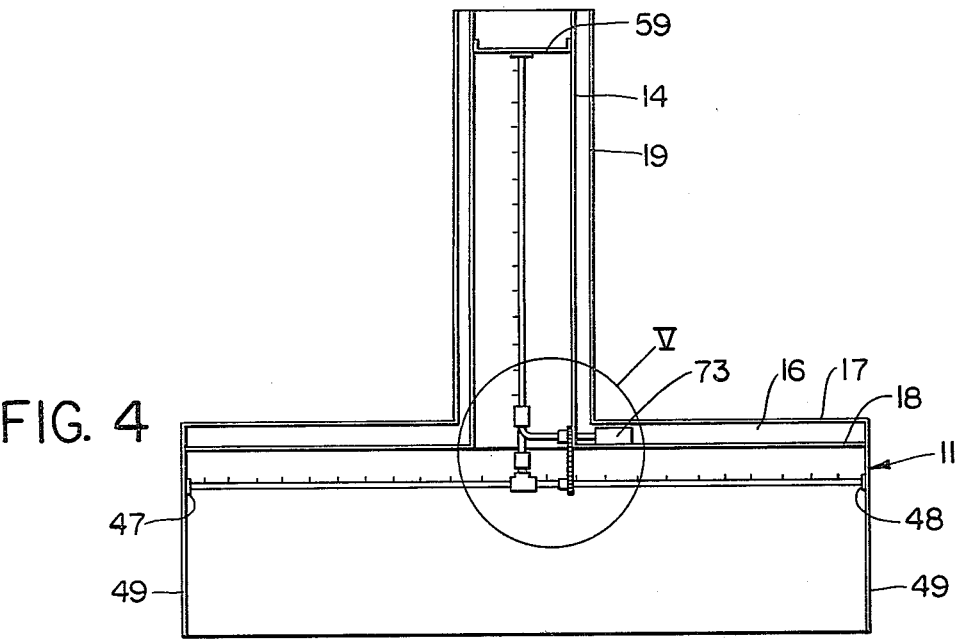
FIG. 4 is a sectional view substantially taken on the line IV—IV of FIG. 3.

The rotary drive assembly 67 includes a rotatable motor 73, (preferably electric) which conveniently mounts atop the inner shell 18, within the inlet air chamber 16 of the hood 11, as seen in FIGS. 3–5. The rotating output shaft 74 of motor 73 extends through a suitable opening in the wall of exhaust stack 14. Secured to the end of motor shaft 74, within the exhaust stack 14 are rotational drive connections to the rotary hood pipe 43 and rotary stack pipe 44, which drive connectors here take the form of a chain drive 76 to the hood pipe 43 and a flexible drive 77 to the lower end of the stack pipe 46 within the swivel 66. The chain drive 76 comprises a coplanar pair of sprockets respectively fixed on the pipe 43 and motor shaft 74 and interconnected by an endless chain loop. The flexible drive 77 may be of conventional type and here comprises an L-shaped conduit 80 fixed at one end to the exterior of swivel 66 and at its other end supported by an internally bushed collar 81 with respect to the end of motor shaft 74. A flexible drive member 79 extends rotatably through the conduit and is fixed to the end of the pipe 44 within the swivel 66 to rotatably drive same. The input end of flexible drive member 79, within the collar 81, is fixed to the free end of the motor shaft 74 for rotation therewith.

Thus, both the substantially horizontal hood wash down pipe 43 and the substantially vertical exhaust stack wash down pipe 44 are simultaneously rotatable by the common drive motor 73. The spray nozzles 46 distributed along the pipes are thus rotated to apply wash liquid to the entire circumferential extent of the surrounding hood and stack surfaces.

Wash liquid is supplied to supply pipe 53 from a supply generally indicated in 81 in FIG. 6. The wash liquid supply 81 here includes a drum 82 for a suitable cleaning agent, such as a detergent and a pump 83 actuable to supply such detergent to a mixture control valve 85. Hot water, for example at a minimum of 140° F., is applied from a conventional hot water source schematically indicated at H, preferably through a conventional vacuum breaker 87 to the mixture control valve 85. The valve 85 is actuable to apply a mixture of hot water and detergent through the supply pipe 53 to the wash down pipes 43 and 44. The valve 85 may be of any convenient type presetable to a desired detergent-hot water ratio and actuable to turn on and off the hot water-detergent mixture input to supply pipe 53. The hot water source H may be for example a conventional water heating tank supplied at city, or higher, water pressure.

A master control panel 88 includes suitable manual and/or automatic means for demand or periodic supply of wash liquid to the wash down pipes 43 and 44, by simultaneous actuation of pump 83 and motor 73 and opening of mixture supply valve 85 as schematically indicated in broken lines at 90, 91 and 92 in FIG. 6. If desired, the valve 85 may be incorporated in the control panel 88 which may in turn be mounted at 85. If desired, the control 88 may be arranged to supply hot water alone, by shutting off detergent pump 83, after a quantity of detergent-water mix has been sprayed from the wash down pipes 43 and 44, for rinsing the hood, filter and exhaust stack surfaces surrounding the wash down pipes. Instead of a central control 88 of manual and/or automatic type, the liquid supply valve 85, detergent pump 83 and rotate motor 73 may be individually manually controlled to perform the wash down operation. If desired, the master control panel 88 may be located other than adjacent the detergent tank. On the other hand, it is contemplated that suitable electrical wash down controls may be mounted adjacent the hood in a readily accessible position, as on the front face of the hood, as at 94 (FIG. 1) for remote actuation of the master wash down control 88.

To collect wash liquid sprayed on and draining from the surfaces of the exhaust stack 14, hood outlet zone 26 and a filter panel 35 at opening 28, the barrier wall 23 forms a substantially V-shaped collection trough 96 (FIG. 10) with the back wall 31 of the hood. A drain conduit 97 connects the bottom edge of the trough 96 to a suitable drain for removal of used cleaning liquid from the hood.

When installed in the opening 28 in barrier wall 23, the filter panel 35 faces directly toward and is directly exposed to the top of the cooking unit 12 and thus its forward (inlet) side tends to collect heavy deposits of grease from the grease laden air swept into the hood from above the cooking unit. While some grease may penetrate through the filter to its rear (exhaust) side, the exhaust side of the filter can be cleaned of accumulated grease and the like by wash liquid sprayed from the rotating pipes 43 and 44. However, washing down the exhaust side of the filter panel does not, and it not intended to, result in cleaning of the intake side of the panel. Particularly, wash liquid expelled from the nozzles on pipe 43 is desirably blocked by the filter 35 and barrier wall 23 from entering the inlet zone 25, to avoid contaminating the space above and surfaces of the cooking unit 12 with used wash liquid carrying grease and other contaminants.

Figure 11:
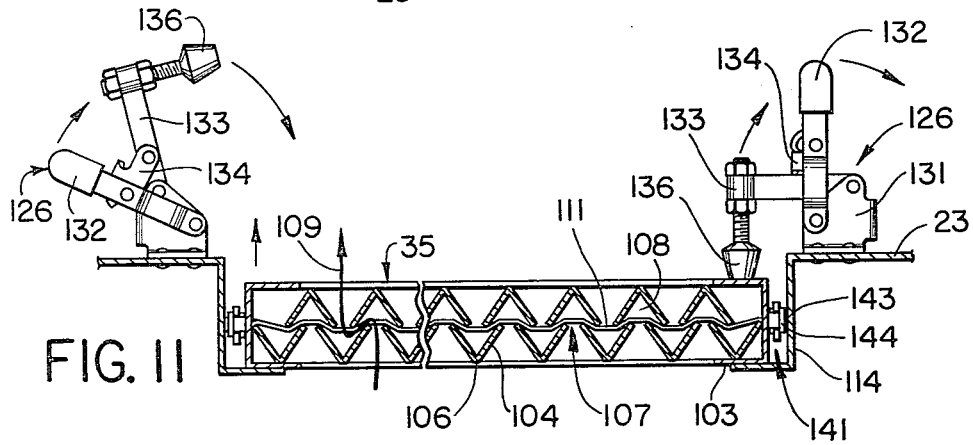
FIG. 11 is an enlarged sectional view substantially as taken along line XI—XI in FIG. 7 and with one of the latches in its released position.

The filter panel 35 preferably comprises a rectangular perimeter frame 103 (FIGS. 7 and 11) of substantially U-shaped, or channel, cross section, which forms a rigid frame work. The actual filtering agent is held by perimeter frame 103 and in the preferred embodiment shown takes the form of two opposed sets of side-by-side trough members 104, here of substantially V-shaped configuration. As seen in FIG. 11, the trough members 104 have their convex faces, or vertices, 106 facing outwardly to form the corresponding side of the filter panel. The free edges of adjacent trough members 104 are spaced apart though substantially less than the width of a given trough member 104, to form an air passage 107 therebetween. As seen in FIG. 11, the free edges of two adjacent troughs 104 are spaced by an air passage 107 and intrude slightly into the opposed mouth 108 of a trough 104 of the opposite set. Accordingly, air passing through the filter panel 35 must travel the substantially S-shaped path 109 and thus tends to deposit entrained grease and other contaminants upon the surfaces of the troughs 104. The ends of the troughs 104 are fixed in the top and bottom channels 103 of the filter panel. To further rigidify the panel, a horizontal strap 111 extends sinuously between the two sets of troughs and is secured by any convenient means not shown, such as welding, to the central portions of each of the troughs 104. Drain holes 112 (FIGS. 7 and 8) are spaced along the top and bottom members of the perimeter frame, at the corners of the channel-shaped cross section, to permit the filter panel 35 to drain free of wash liquid applied thereto. While filter panels of different construction may be used in connection with the present invention, filter panels of the type shown at 35, with the interfingered troughs 104, have proved advantageous, not only for effectively filtering grease from air passing therethrough, but also for blocking travel of wash liquid from the sprays within the exhaust zone 26 of the hood, out into the inlet zone 25 and onto the cooking unit 12.

Figure 7:
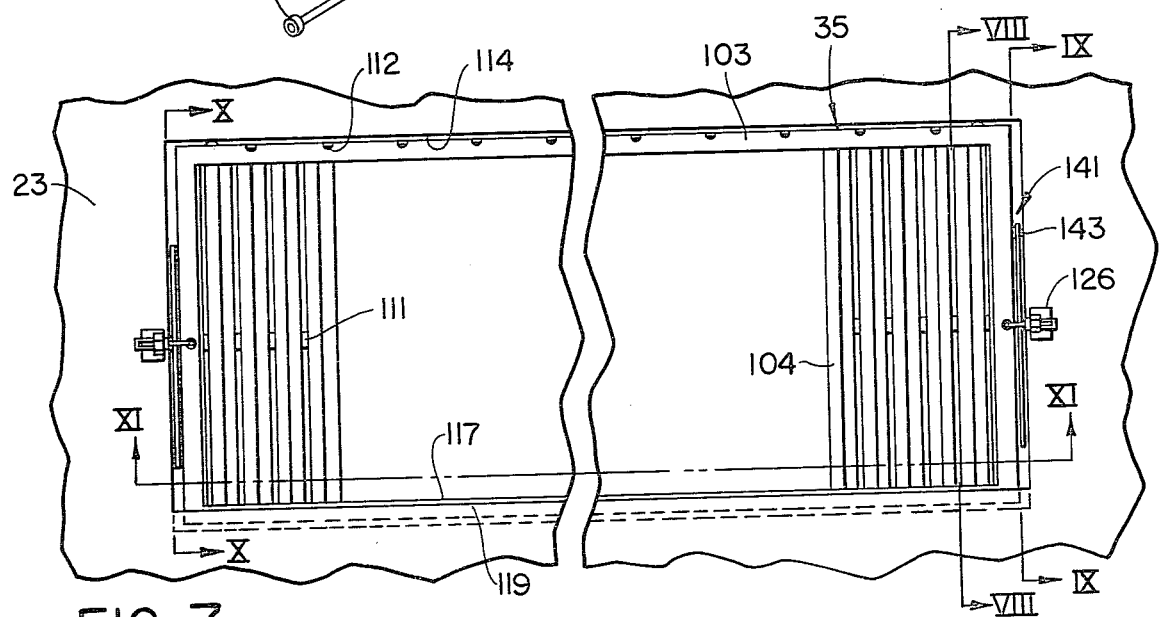
FIG. 7 is an enlarged fragmentary view, taken substantially along the line VII—VII in FIG. 2 and show
Figure 8:
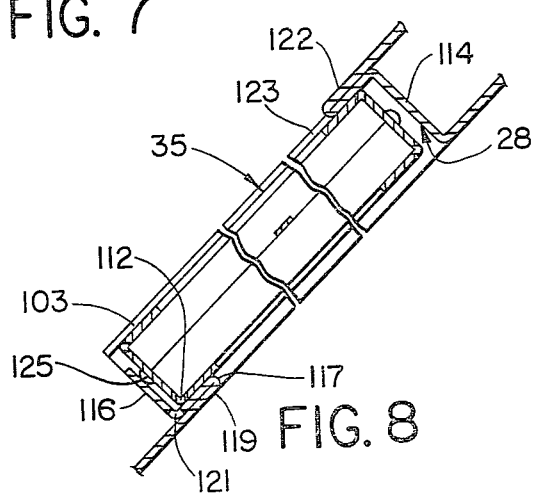
- FIG. 8 is an enlarged fragmentary sectional view substantially taken on the line VIII—VIII of FIG. 7.
Figure 9:
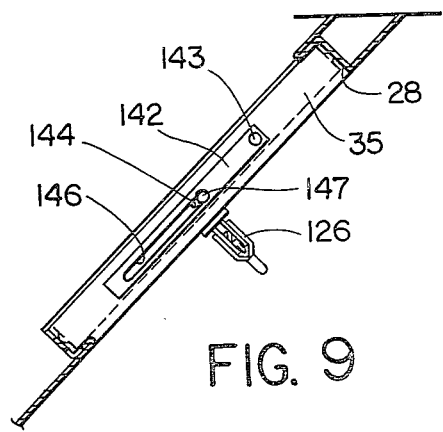
FIG. 9 is a fragmentary sectional view substantially taken on the line IX—IX of FIG. 7.

To support the filter panel 35 in its normal use position of FIGS. 7-9, the barrier wall 23 includes a rectangular perimeter flange 114 which extends rearward (leftward in FIG. 10) therefrom to a depth preferably somewhat exceeding the depth of the filter panel 35.

The top and opposed sides of the perimeter flange 114 frame the fume opening 28 in the barrier wall 23. The bottom length 116 of perimeter flange 114 is spaced somewhat below the lower edge 117 of the fume opening 28 leaving an upward extending lip 119 along the bottom of fume opening 28. Plural drain openings 121 (FIG. 8), spaced along the forward edge of the bottom length 116 where it joins the lip 117, permit wash liquid draining from the filter panel 35 to drain downward along the inner surface of the barrier wall 23 to the drain conduit 97. The lower edge portion of the filter panel 35 rests on the flange bottom length 116 and lip 117. The bottom length 116 prevents the filter panel from sliding down along the inside of the barrier wall 23 and the lip 117 prevents the lower filter edge from falling forward out of the opening 28.

To block rearward movement of the filter panel 35 from its position of use into the exhaust zone 26 of the hood, further lips 122 and 123 on the rear edges of the top and side parts of perimeter flange 114 overlap the opening 28.

Latches 126, preferably fixed on opposite sides of the opening 28 to the barrier wall 23, prevent the filter panel 35 from falling forwardly from its normal operating position of FIGS. 7-9 and 11. In such operating position, the latches 126 urge the back face of the filter panel 35 against the top and side lips 122 and 123, while the bottom edge of the filter panel 35 rests atop the flange bottom length 116 at lip 119. Preferably the filter panel 35 has small risers 125 along its upper and lower edges to space the filter perimeter frame 103 a bit above the flange bottom length 116.

In the embodiment shown, the latches 126 shown in FIG. 11 are conventional over-center latch units each having a base 131 fixed, as by rivets to the barrier wall 23 and pivotally supporting an operating lever 132 and a clamping lever 133, which are pivotally interconnected by an over-center link 134. A resilient block 136 adjustably supported on the free end of clamping lever 133 forceably engages the forward face of the filter panel 35 in the latched, over-center position of operating lever 132 (to the right in FIG. 11) and, alternatively, swings forwardly and laterally away from the filter panel 35 in response to unlatching movement of the operating lever 132 to its position to the left in FIG. 11, to permit the filter panel 35 to move forwardly out of opening 28. When closed, the latches 126 snugly urge the filter panel against the lips 122 and 123.

A pivoting lost motion connection 141 (FIGS. 7, 9 and 10) permits cleaning of both sides of the filter panel 35 while it is attached to the hood 11. Connection 141 comprises an elongate link 142 on each side of the filter panel 35. The upper end of each link 142 is pivoted at 143 on the corresponding side of the perimeter flange 114 at the edge of opening 28. The location of pivot 143 preferably is somewhat above the center of the opening 28. A headed pin 144 fixed centrally to and extending sidewardly from the perimeter frame 103 of filter 35 is captive in pivoting and sliding relation in a slot 146 extending the major, lower length of the link 142. When installed in opening 28 as in FIG. 9, the link 142 extends from its pivot 143 along the adjacent side of the filter panel 35 with the filter supporting pin 144 near but not at the top of the slot 146 in link 142.

Upon release of the latches 126, the filter 35, in response to gravity, pivots forwardly as generally indicated by arrow R (FIG. 10) raising the lower end of the filter 35 over the lip 119. At the same time, the link 132 pivots forward along arrow S and the filter panel, riding on its sidewardly extending pins 144, slides downward along the slots 146 of links 142 to the bottom thereof, as indicated by arrow T. Thereafter, the filter panel 35 can be manually rotated, as indicated by arrows U, through 180°. The above-mentioned removal steps, indicated by arrows T, S and R, can then be reversed to restore the panel 35 to its installed position in opening 28 but with the sides reversed.

Figure 10:
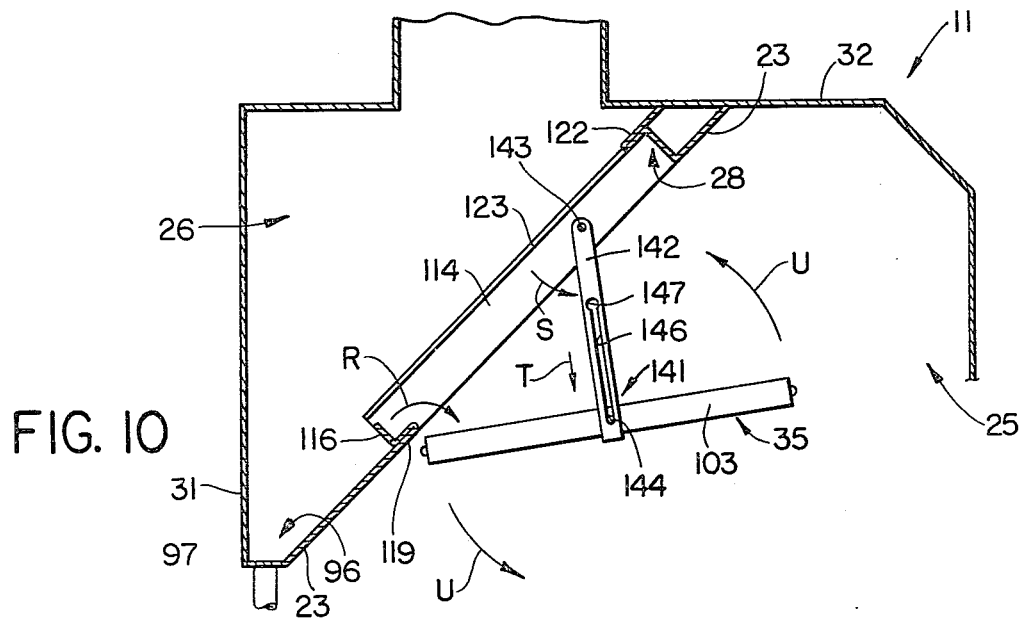
FIG. 10 is an enlarged sectional view substantially taken on the line X—X of FIG. 7 and showing a fragment of FIG. 2 to illustrate the mounting and reversability of the filter panel.

In a typical wash down operation, the wash down pipes 43 and 44 are operated briefly to clean one side of the filter panel 35 installed in the opening 28, the liquid supply to the rotating pipes 43 and 44 is shut off, and the filter panel 35 is reversed as indicated by arrows R, S, T and U above-discussed with respect to FIG. 10. With the filter panel 35 installed once again in opening 28, but reversed side-for-side, the wash down pipes are once again actuated, and wash the other side of the filter panel 35. After a period of use of the hood 11 this washing cycle can be repeated, either by manual actuation or automatically as desired. In addition to cleaning both sides of the filter, this wash down cycle also results in cleaning of the remaining interior surfaces of the outlet zone 26 of the hood 11 and of the exhaust stack 14, as a result of the wash liquid sprayed by the rotating pipes 43 and 44 on these surfaces.

As seen above, the filter unit 35 during its 180° reversal described with respect to FIG. 10, remains pivotally and slidably joined to the links 142 by reason of the engagement of its headed pins 144 and the corresponding slots 146. If desired, the filter unit 35 can readily be disconnected from the links 142 while in its FIG. 10 position, simply by raising filter unit 35 upward along the slots 146 until pins 144 reach the top of the slots. The tops of the slots are enlarged as indicated at 147, sufficient to pass axially therethrough the large head of the corresponding pin 144, as by slight laterally outward flexing of the links 142. Reinstallation of a filter unit on its links 142 is accomplished by reversal of such steps.

The enlarged upper end 147 of the slot 146 lies somewhat above the corresponding pin 144 with the filter unit 35 in the filter opening 28, as can be seen in FIG. 9. Moreover, the filter unit 35 is free to pivot forwardly and downwardly (via arrow R in FIG. 10) without advancing the pin 144 upward into the enlarged upper end 147 of slot 146. Accordingly, the pins 144 are normally laterally retained by their enlarged heads within the corresponding slots 146, either in the FIG. 9 position of use or the FIG. 10 reversing manipulation, such that the filter unit 35 is removable from the links 142 only by a purposeful raising of its pins 144 above their normal range of movement within the slots 146 so that they can reach and exit from the enlarged upper slot ends 147.

MODIFICATION

Figure 12:
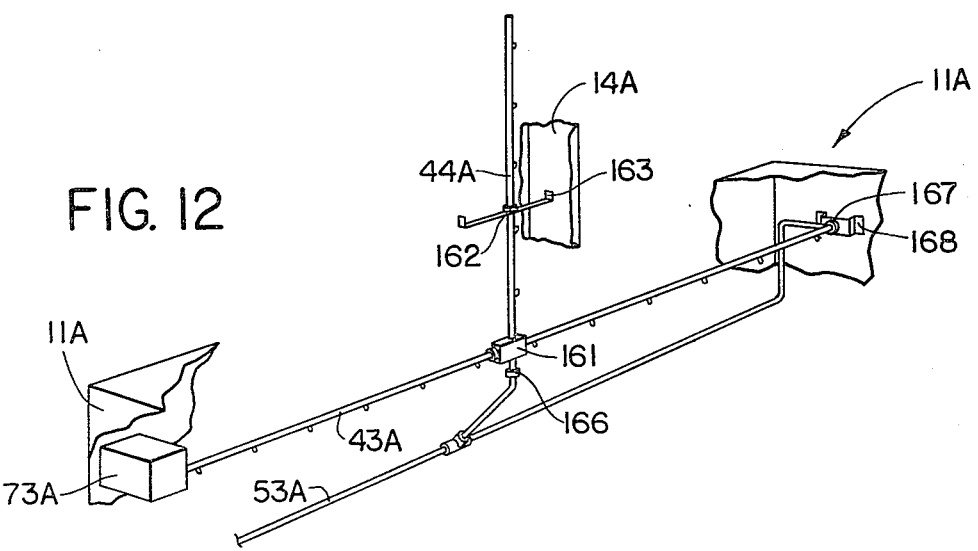
FIG. 12 is a view similar to FIG. 6 but showing a modified interrelation of wash down pipes.

FIG. 12 schematically discloses a modified wash down pipe arrangement. Parts of the FIG. 12 apparatus, similar to parts in FIGS. 1-11, carry the same reference numerals with the suffix "A" added. In FIG. 12 the horizontal hood wash down pipe 43A is moved forward in the hood 11A so as to be coplanar with the upstanding stack wash down pipe 44A. This permits rotative joining of pipes 43A and 44A through a conventional right-angle gear drive, or transmission, 161. Also in FIG. 12, the rotative drive motor 71A is conveniently mounted on one side of the hood 11A with its drive shaft fixed to the adjacent end of the hood pipe 43A to rotatably drive same, and through the transmission 161, to simultaneously rotatably drive the stack pipe 44A. To assist in locating the rotating pipes 43A and 44A, the lower portion of 44A, just above transmission 161, passes through a suitable bushing 162 carried by a strap member 163. The strap member 163 may be similar to aforementioned strap member 59 of of FIG. 6, spans the lower end portion of the exhaust stack 14A and is suitably anchored to the sidewalls thereof. Wash liquid is brought into the hood 11A by a fixed supply pipe 53A which connects to the upstanding stack pipe 44A through a conventional water transfer swivel 166 and additionally connects to the horizontal hood pipe 43A. The latter connection is conveniently through a conventional right-angle swivel 167 which is also provided with mounting flanges 168 for rotatably supporting the rightward end of the horizontal pipe 43A on the rightward wall of the hood 11A. Additional supporting bearing may be provided along the rotatable wash down pipes, as at the upper end of the pipe 44A generally in the manner of FIG. 6 at 59,61.

The FIG. 12 embodiment operates substantially in the manner above-described with respect to the embodiment of FIGS. 1-11. The FIG. 12 embodiment reduces somewhat the number of piping and drive components in the central area of the hood 11A, by use of the right angle drive transmission 161 to join the pipes 33A and 44A in substantially coplanar relation. However, the FIG. 12 arrangement requires the hood pipe 43A to be shifted forward somewhat from its generally centered location of FIGS. 1-11, bringing it closer to the filter panel, which, unless particular care is taken in distributing spray nozzles along the horizontal wash down pipe, may produce a less uniform washing action than in the FIGS. 1-11 embodiment.

The pipes and pipe fittings disposed within the hood 11 or 11A, as above-discussed with respect to FIGS. 1-12, are preferably of stainless steel for maximum durablity. However, use of other materials, such as galvanized steel, is also contemplated. The aforementioned swivels of FIGS. 1-12 are preferably commercially available, nickle-plated swivel connectors with impregnated teflon bearings for reducing rotating friction. In one embodiment, standard ½ inch size pipe was used for the rotating pipes and liquid supply pipe assembly. Typically, in the embodiment of FIGS. 1-11, nozzles are distributed on 8 inch centers along the hood wash down pipe 43 and deliver about 0.7 gallon per minute of wash down liquid at about 40 pounds per square inch pressure, while nozzles on the stack pipe 10 are disposed on 10 inch centers with each delivering about 0.4 gallons per minute at about 40 pounds per square inch pressure. Consideration has been given to use of a higher pressure wash liquid supply and in one embodiment, according to the modified FIG. 12 embodiment for example, nozzles on the pipes 43A and 44A are distributed on about 6 inch centers with each delivering about 0.5 gallon per minute at about 150 pounds per square inch pressure.

Although a particular preferred embodiment of the invention has been disclosed in detail for illustrative purposes, it will be recognized that variations or modification of the disclosed apparatus, including the rearrangement of parts, lie within the scope of the present invention.

The embodiments of the invention in which an exclusive property or privilege is claimed are defined as follows:

1. In a filtered ventilating unit for a cooking system, including:
   a hood emplaceable above a cooking unit and opening downward theretoward for capturing fumes released during cooking;
   an exhaust stack open to and extending from said hood for removing fumes entrapped by said hood;
   a barrier wall extending widthwise of said hood dividing the interior of said hood into inlet and exhaust zones respectively open to said cooking unit and exhaust stack, said barrier wall having a fume opening therethrough and means for locating a filter panel across said opening to filter out grease and the like from said cooking fumes prior to entry into said exhaust stack;
   a rotatable stack wash down pipe having spray means and extending within said exhaust stack substantially from said hood exhaust zone, said stack wash down pipe being supported for rotation in said exhaust stack;
   means for supplying washing liquid to said stack wash down pipe;
   the improvement comprising:
   a rotatable hood wash down pipe in said exhaust zone of said hood adjacent said filter panel location, said rotatable hood wash down pipe extending substantially the width of said exhaust zone and having plural spray outlets distributed thereon along substantially the full width of said filter panel, and means supporting said hood wash down pipe on said hood for rotation about the length axis of said pipe, said rotatable hood wash down pipe extending at least near said rotatable stack wash down pipe, with said rotatable hood wash down pipe having its rotation axis crossing at least close to the rotation axis of said rotatable stack wash down pipe and lying in a plane intersected by said rotation axis of said stack wash down pipe;
   a common rotational drive means connecting said rotatable stack and hood wash down pipes to each other in rotational driving relation, said common rotational drive means being located adjacent the opening of said exhaust stack to said hood for simultaneously rotating said hood and stack wash down pipes about their respective axes, said common rotational drive means including rotating portions with differently oriented axes of rotation;
   means for supplying said rotatable hood wash down pipe with a washing liquid for rotating sprays of said washing liquid across the hood and filter surfaces extending widthwise in said exhaust zone.

2. The system of claim 1 in which said common rotational drive means connects said common motor to said stack wash down pipe through a flexible drive shaft and to said hood wash down pipe through an endless loop drive member.

3. The system of claim 1 in which said motor drives said first wash down pipe and said hood wash down pipe rotatably drives said stack wash down pipe through a right angle drive unit, said common rotational drive means comprising said right angle drive unit.

4. The system of claim 1 in which said stack and hood wash down pipes are substantially coplanar and said common rotational drive means includes a right angle drive unit interconnecting said stack and hood wash down pipes such that rotation of one rotatably drives the other.

5. The system of claim 1 including a common drive motor cooperating with said rotational drive means to drive both of said stack and hood wash down pipes.

6. The system of claim 1 in which said first and second wash down pipes connect to said liquid supply means through separate rotation swivels.

7. The system of claim 1 in which said hood wash down pipe is offset rearward from and below said stack wash down pipe to position said hood wash down pipe nearer the rear wall of said exhaust zone of said hood than to said filter, said wash liquid supply means including a feed pipe separately connected to said hood and stack wash down pipes from a common wash liquid supply.

8. The system of claim 7 in which said feed pipe includes at least one bend and interconnects the intermediate portion of said hood wash down pipe with the lower end portion of said stack wash down pipe and is itself connected to said wash liquid supply, a first swivel connector interposed in said hood wash down pipe and connecting said feed pipe thereto and a second swivel connector connecting said feed pipe to said stack wash down pipe.

9. The system of claim 7 in which said common rotational drive means comprises a motor mounted on said hood beside said exhaust stack and having a shaft means extending into said exhaust stack and rotative drive means connecting said extended part of said shaft to said hood and stack wash down pipes for rotating same.

10. In a filtered ventilating system for a cooking unit, including:
a hood emplaceable above a cooking unit and opening downward theretoward for capturing fumes released during cooking;
an exhaust stack connected to said hood for removing cooking fumes entrapped by said hood;
a barrier wall extending widthwise of said hood and dividing the interior of said hood into inlet and exhaust zones respectively open to said cooking unit and said exhaust stack, said barrier wall having a fume opening therethrough;
a filter panel operatively disposed across said fume opening to filter grease and the like from said cooking fumes entering said hood exhaust zone and exhaust stack;
the improvement comprising:
a rotatable wash down pipe extending along the width of and behind said filter panel within the exhaust zone of said hood and supported for rotation about its length axis;
means actuable for rotating said wash down pipe and supplying same with a washing liquid, said wash down pipe having spray means thereon distributed widthwise of said hood and filter for rotatively spraying said washing liquid thereon;
means removably locating said filter panel in a filtering position on said barrier wall for normally covering said fume opening therein against entry into said exhaust zone of solids to be filtered and against entry into said intake zone to wash liquid from said rotating spray means, said filter panel having one side facing said rotatable wash down pipe for washing thereby;
means on said hood movable for guiding (1) withdrawal of said filter panel away from said rotatable wash down pipe into said inlet zone, (2) reversal of said filter panel side for side through a 180° pivoting thereof at a location in said inlet zone remote from said rotatable wash down pipe, and (3) return of said filter panel toward said exhaust zone to its filtering position on said barrier wall with its opposite side facing said rotatable wash down pipe for washing thereby.

11. The system of claim 10 in which said means for removably locating said filter panel further comprises overcenter latch means actuable for fixedly securing said filter panel in said fume opening.

12. The system of claim 10 in which said movable guiding means comprise, at each end of said filter panel, a link pivotally connected to said filter panel and, at a spaced location thereon, pivotally connected to said barrier wall at the corresponding end of said fume opening therein, said pivotal connections of said link permitting removal and replacement of said filter panel with respect to said fume opening, said link including lost motion means interposed between said pivots for permitting translation of said filter panel to a location in said inlet zone spaced from said barrier wall so that said filter panel is pivotable through at least about 180° on said links and without interference with said barrier wall and rotatable wash down pipe.

13. The system of claim 12 in which said fume opening has lips along the upper and lower edges thereof, one said lip engaging the said filter panel on the inlet zone side thereof and the other said lip engaging said filter panel on the exhaust zone side thereof, so as to positively block pivoting of said filter panel in one direction but permit same in the opposite direction.

14. The system of claim 13 in which said filter panel comprises a series of transversely extending troughs in which alternate ones face toward said cooking unit and the remaining ones face toward adjacent side edges of said alternate ones, said troughs extending substantially downward along said barrier wall in their position of use, said inlet zone lip being at the bottom edge of said fume opening in said barrier wall having open portions along its lower edge for gravitational escape of wash down liquid therefrom along the inside face of said barrier wall, said barrier wall being sloped.

15. In a filtered ventilating system for a cooking unit, including:
a hood emplaceable above a cooking unit and opening downward theretoward for capturing fumes released during cooking;
an exhaust stack for removing cooking fumes entrapped by said hood, a barrier wall extending widthwise of said hood and dividing the interior of said hood into inlet and outlet zones respectively open to said cooking unit and said exhaust stack, said wall having a fume opening therethrough;
a filter panel disposable across said fume opening to filter out grease and the like from said cooking fumes prior to entry into said exhaust stack;
latch means for holding said filter panel in place in said fume opening;
the improvement comprising:
a pair of links, first pivots at one end of said links pivotally mounting said links on said barrier wall at opposite sides of said fume opening, the other ends of said links being pivotable from a retracted position extending along said barrier wall;
second pivots at said other end of said links pivotally mounting the central portions of sides of said filter panel on said other ends of said links for rotation of said filter panel through at least 180° with respect to said links, the maximum spacing from said first to said second pivots on each link exceeding one-half the height of the filter panel, said links being pivotable on said first pivots to an extended position angling at about a right angle from said barrier wall into said inlet zone for permitting said 180° rotation of said filter panel without interference between said filter panel and barrier wall;

said barrier wall including a bottom lip along the front bottom edge of the fume opening and extending upward to block the bottommost portion of the filter panel from moving forward into said intake zone;

said links each incorporating lost motion means acting along the length thereof (1) for increasing the separation between the first and second pivots on each link to achieve said maximum spacing, and (2) for decreasing the separation between the first and second pivots on each link to permit the lower edge of the filter panel to clear said bottom lip as said filter panel enters or leaves said fume opening.

16. The system of claim 15 including wash down means within said hood behind said barrier wall and actuable for applying a wash liquid to the backside of said barrier wall and filter panel for washing collected cooking grease and the like therefrom, said pivot links permitting reversal of said filter panel in said fume opening and thereby allowing washing of the opposite faces of said filter panel.

* * * * *

UNITED STATES PATENT OFFICE
CERTIFICATE OF CORRECTION

Patent No. 4 231 769          Dated November 4, 1980

Inventor(s) Willard K. Ahlrich

It is certified that error appears in the above-identified patent and that said Letters Patent are hereby corrected as shown below:

Column 10, line 52; "Claim 1" should be ---Claim 5---.
Column 10, line 57; "Claim 1" should be ---Claim 5---.
Column 11, line  4; "Claim 1" should be ---Claim 5---.
Column 11, line  4; change "first" to ---stack---.
Column 11, lines 4-5; change "second" to ---hood---.
Column 11, line 60; change "to" to ---of---.
Column 12, line 18; change "pivots" to ---pivotal connections---.

Signed and Sealed this

Third Day of March 1981

[SEAL]

Attest:

RENE D. TEGTMEYER

Attesting Officer        Acting Commissioner of Patents and Trademarks